US006676190B2

(12) United States Patent
Daniels et al.

(10) Patent No.: US 6,676,190 B2
(45) Date of Patent: Jan. 13, 2004

(54) HEADLINER MOUNTED POWER LIFTGATE DRIVE MECHANISM

(75) Inventors: Andrew R. Daniels, Newmarket (CA); Aleksander Kaczmarczyk, Newmarket (CA); Miroslav Janda, Toronto (CA); Kris Tomaszewski, Markham (CA); Thomas P. Frommer, Mount Albert (CA); Kathryn Petroff, East York (CA); Juliusz E. Kirejczyk, Newmarket (CA)

(73) Assignee: Atoma International Corp., Newmarket (CA)

( * ) Notice: Subject to any disclaimer, the term of this patent is extended or adjusted under 35 U.S.C. 154(b) by 0 days.

(21) Appl. No.: 10/258,647

(22) PCT Filed: Apr. 27, 2001

(86) PCT No.: PCT/CA01/00572

§ 371 (c)(1),
(2), (4) Date: Oct. 25, 2002

(87) PCT Pub. No.: WO01/83924

PCT Pub. Date: Nov. 8, 2001

(65) Prior Publication Data

US 2003/0089041 A1 May 15, 2003

Related U.S. Application Data

(60) Provisional application No. 60/200,047, filed on Apr. 27, 2000.

(51) Int. Cl.[7] .................................................. B60J 5/10

(52) U.S. Cl. ................ 296/106; 296/146.4; 296/146.8; 49/139

(58) Field of Search .......................... 296/146.4, 146.8, 296/106, 56; 49/139, 140, 339–342, 336; 74/625

(56) References Cited

U.S. PATENT DOCUMENTS

| | | | | | |
|---|---|---|---|---|---|
| 2,833,536 | A | | 5/1958 | Joachim et al. | |
| 3,713,472 | A | * | 1/1973 | Dozois | 296/56 |
| 3,716,945 | A | | 2/1973 | Cooper et al. | |
| 6,055,776 | A | * | 5/2000 | Dettling et al. | 49/341 |
| 6,202,350 | B1 | * | 3/2001 | Montgomery et al. | 49/139 |
| 6,234,563 | B1 | * | 5/2001 | Bascou | 296/146.8 |
| 6,270,147 | B1 | * | 8/2001 | Butler et al. | 296/146.4 |
| 6,382,706 | B2 | * | 5/2002 | Yuge et al. | 296/146.4 |
| 6,405,486 | B1 | * | 6/2002 | Rogers, Jr. et al. | 296/146.8 |
| 6,513,859 | B2 | * | 2/2003 | Yuge | 296/146.4 |
| 6,550,839 | B2 | * | 4/2003 | Rogers, Jr. et al. | 296/56 |

FOREIGN PATENT DOCUMENTS

| | | |
|---|---|---|
| FR | 2 769 941 A1 | 10/1997 |

* cited by examiner

*Primary Examiner*—Stephen T. Gordon
*Assistant Examiner*—Greg Blankenship
(74) *Attorney, Agent, or Firm*—Clark Hill PLC

(57) ABSTRACT

A power liftgate drive assembly automatically moves the liftgate of a vehicle between its open and closed positions. The drive assembly is secured to the vehicle at a position near the top of the liftgate. The drive assembly includes a motor that drives a sector gear between two positions. A guide rod is secured to the sector gear to translate the rotational movement of the sector gear into the pivotal movement of the liftgate. A slot extends through the sector gear that allows the liftgate to be moved manually. A latch locks the guide rod in position with respect to the sector gear for automated movement whereas the latch releases the guide rod to move in the slot for manual operation.

20 Claims, 6 Drawing Sheets

HEADLINER MOUNTED POWER LIFTGATE DRIVE MECHANISM

This claims the benefit of provisional application No. 60/200,047 filed on Apr. 27, 2000.

FIELD OF THE INVENTION

The invention relates to an assembly for opening and closing a liftgate of a motor vehicle. More specifically, the invention relates to an automated assembly designed to move a liftgate of a motor vehicle between an open position and a closed position.

DESCRIPTION OF THE RELATED ART

Motor vehicles commonly include a liftgate typically connected to the rear of the vehicle. These liftgates are pivotal between an open position and a closed position to selectively provide access to the rear compartment of the vehicle. These liftgates are typically manually operated by pivoting the liftgate about a pair of hinges between the open and closed positions. A pair of hydraulic or pneumatic cylinders are often connected between the liftgate and the vehicle to assist in the opening of the liftgate and in maintaining the liftgate in the open position.

There is a desire to provide operators of motor vehicles with the ability to open and close liftgates free of manual assistance. This feature of providing power to a liftgate in a manner that moves the liftgate between its two extreme positions could be easily obtained if the task were merely to provide and remove access to a compartment within a motor vehicle. The task is, however, more extensive than that. The ability to open and close the compartment must be provided only when it is coupled with the ability to manually move the liftgate without having to provide an additional force to overcome the automation system. Further, the assembly that creates the force to automatically move the liftgate must be lightweight and minimally impact the capacity of the compartment to which the liftgate provides access.

Attempts have been made to provide a power liftgate drive mechanism that will automatically raise or lower the liftgate between its open and closed positions. U.S. Pat. No. 5,448,856, issued to Moore et al. on Sep. 12, 1995, discloses a powered liftgate mechanism. This mechanism includes a motor which moves a crank arm using an assembly that includes a worm shaft and gears. While the motor provides a force to move the liftgate between its open and closed positions, it requires the assistance of gas springs or struts to move the liftgate. Little mechanical advantage is provided by the powered liftgate mechanism. Therefore, when using the mechanism disclosed in this patent, modifications to the motor vehicle are required before the liftgate mechanism may operate correctly.

SUMMARY OF THE INVENTION

A power liftgate drive assembly moves a liftgate of a motor vehicle between an open position and a closed position. The power liftgate assembly includes a bracket that is mounted to the motor vehicle adjacent the liftgate. The drive mechanism is fixedly secured to the bracket. The drive mechanism provides a bidirectional rotational force. A gear is pivotally secured to the bracket. The gear is coupled to the drive mechanism to receive the bidirectional rotational force to pivot the gear with respect to the bracket. The gear defines a slot extending between first and second ends. The power liftgate drive assembly also includes a striker bar coupled to the gear. The striker bar slides through the slot. A guide rod connects the striker bar to the liftgate. The power liftgate drive assembly also includes a latch secured to the gear and operable between a latched position and an unlatched position. The latch engages the striker bar when in the latched position. This prevents the striker bar from moving along the slot. The striker bar moves through movement of the gear which is moved to power the liftgate between the open and closed positions. The latch disengages the striker bar when in the unlatched position allowing the striker bar to move along the slot allowing the liftgate to be moved manually between the open and closed positions.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Figure 1:
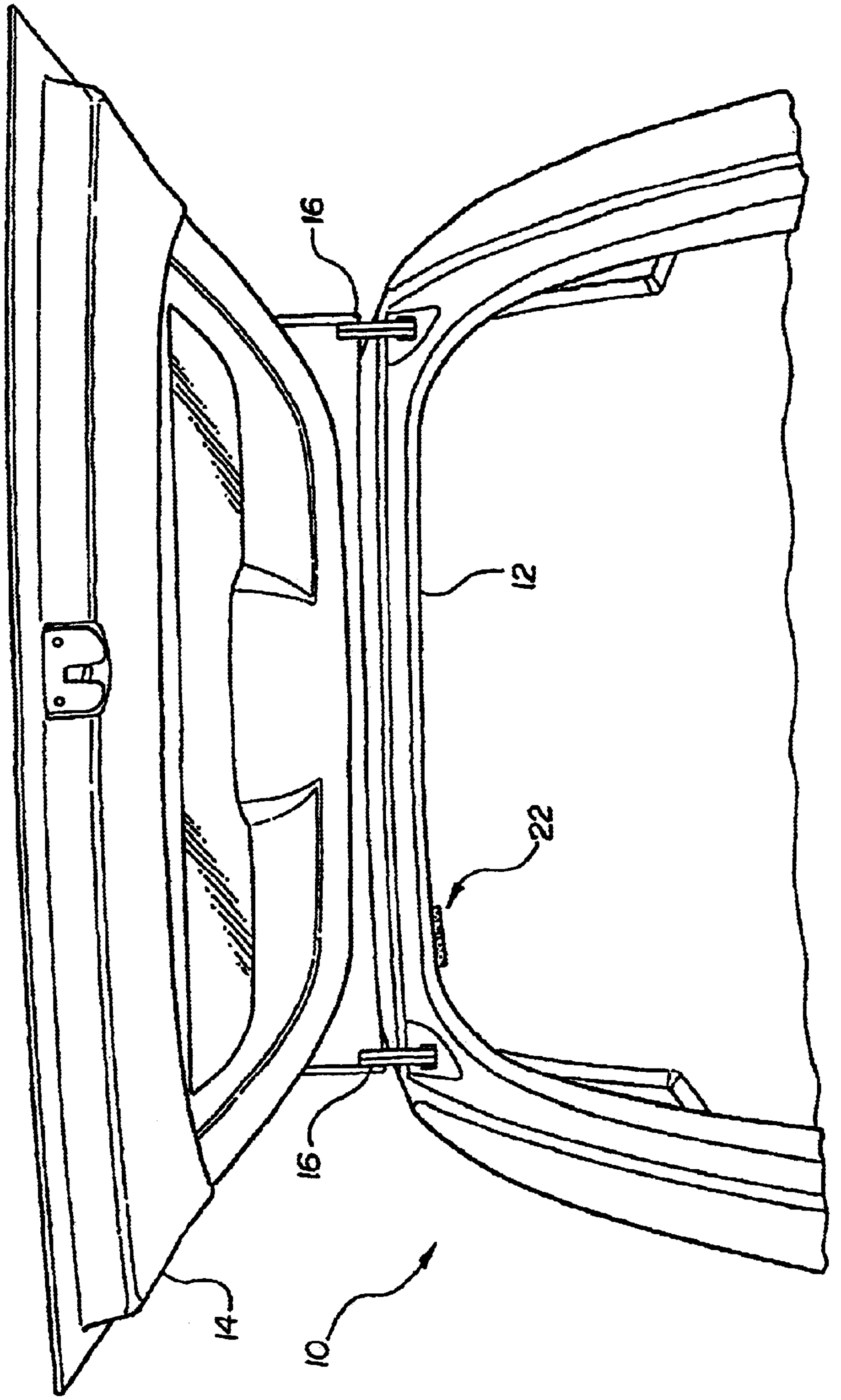
FIG. 1 is a rear view, partially cut away, of a motor vehicle incorporating one embodiment of the invention, with the liftgate of the motor vehicle in the open position.

Referring to the Figures, wherein like reference characters represent like or corresponding elements throughout the several views and, a portion of a motor vehicle is generally shown at 10. Referring specifically to FIG. 1, the motor vehicle 10 includes a rear portion defining a rear access opening 12. The rear access opening 12 provides access into the compartment immediately adjacent thereto. A liftgate, or tailgate, 14 is pivotally secured to the rear portion of the motor vehicle 10 by a pair of gooseneck-shaped hinges 16. The liftgate 14 pivots about the hinges 16 between an open position, shown in FIG. 1, and a closed position covering the rear access opening 12 in a conventional manner.

Figure 2:
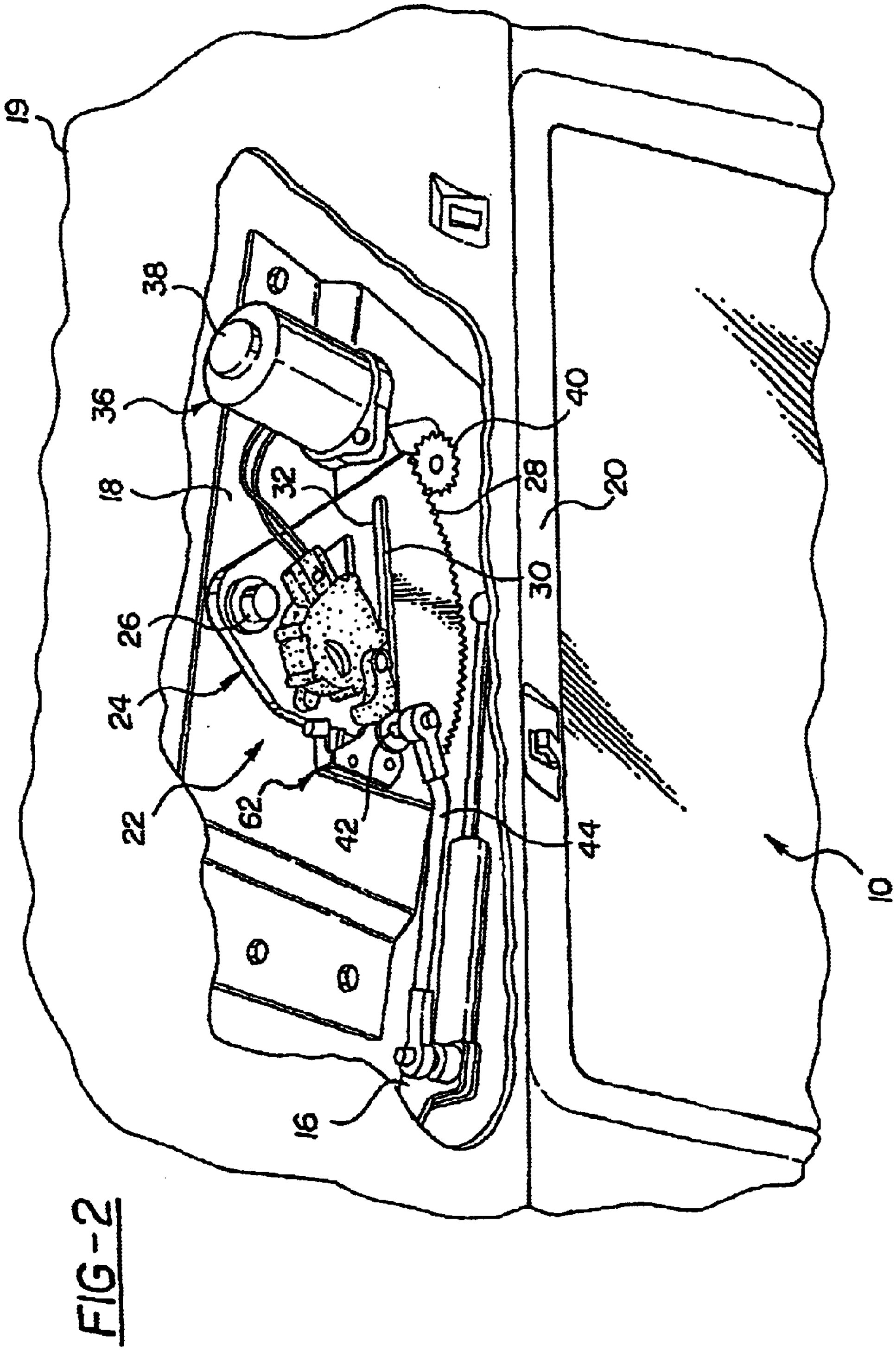
FIG. 2 is a prospective view, partially cut away, of one embodiment of the invention.
Figure 3:
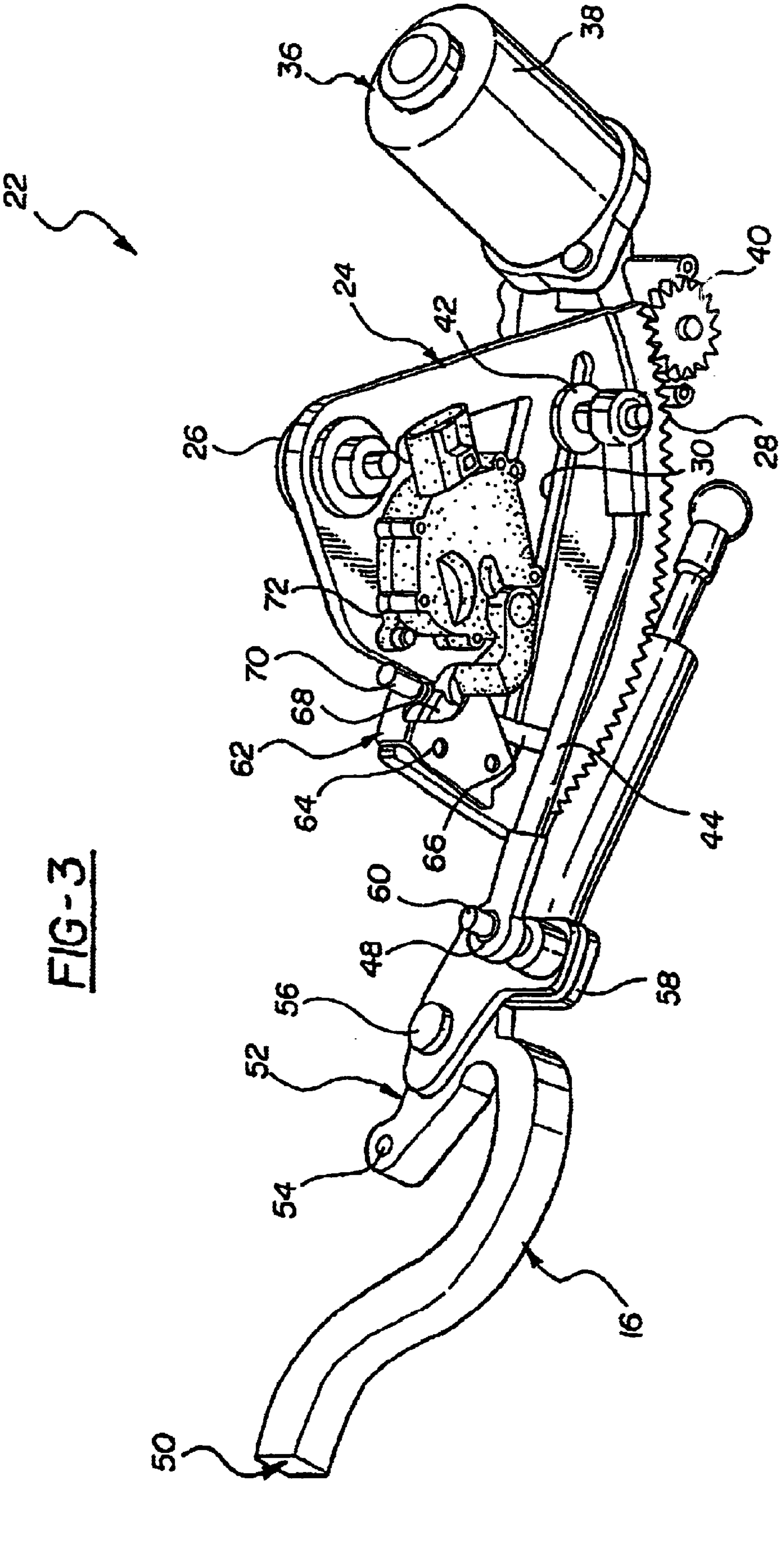
FIG. 3 is a prospective view of one embodiment of the invention.

Referring to FIG. 2, a bracket 18 is mounted to a portion of the ceiling 19 of the motor vehicle 10 adjacent the rear access opening 12. In the embodiment shown in FIG. 2, a headliner 20 covers the bracket 18 and the rest of the invention 22, discussed in greater detail subsequently. A portion of the headliner 20 is shown cut away to view the invention 22. While the invention 22 is shown secured to the ceiling 19 under the headliner 20, it should be appreciated by those skilled in the art that the invention 22 may be mounted to a pillar or another structural element of the motor vehicle 10 other than the ceiling 19 thereof.

The invention 22 is a sector gear power liftgate assembly. The sector gear power liftgate assembly 22 includes a gear, generally shown at 24. While any gear may be used, including a linear rack, the gear shown in the embodiments is a sector gear 24. A pivot axle 26 is used to mount the sector gear 24 to the mounting bracket 18 to allow the sector gear 24 to pivot thereabout. As is shown in the Figures, the sector gear 24 is positioned in a plane generally parallel to the mounting bracket 18.

The sector gear 24 includes a rack of gear teeth 28 on an arcuate edge thereof opposite the pivot axle 26. The sector gear 24 defines a slot 30. The slot 30 extends along a line in the embodiment shown in FIGS. 1 through 5. The slot 30 is arcuate in the embodiment shown in FIG. 6. This embodiment will be discussed in greater detail subsequently.

The slot 30 extends between a first end 32 and a second end 34 in a chord-like manner. The slot 30 is between the pivot axle 26 and the rack of gear teeth 28.

A drive mechanism, generally shown at 36, is fixedly secured to the bracket 18. The drive mechanism 36 provides a bidirectional rotational force to drive the sector gear 24 between its two extreme positions. The drive mechanism 36 includes a motor 38 that is powered through the electrical power system of the motor vehicle (not shown). The motor 38 drives an output shaft 39 to rotate in either a clockwise or counter clockwise direction, depending on whether the liftgate 14 is to be opened or closed.

The output shaft 39 drives a toothed drive gear 40. The toothed drive gear 40, in turn, meshes with the rack of gear teeth 28 and drives the sector gear 24 between its two extreme positions. The toothed drive gear 40 acts as a pinion as it moves the rack of gear teeth 28.

The sector gear power liftgate assembly 22 also includes a striker bar 42. The striker bar 42 is slideably retained within the slot 30 between the first 32 and second 34 ends.

An elongated guide rod 44 is connected to the striker bar 42. The guide rod 44 extends between a first end 44, connected to the striker bar 42, and a second end 48. The second end 48 is connected to the hinge 16 and, hence, the liftgate 14. Therefore, the guide rod 44 moves the liftgate 14 when the striker bar 42 is moved by the desires of the operator of the liftgate 14. More specifically, the hinge 16 includes a distal end 50 connected to the liftgate 14 and a proximal end 52. The hinge 16 has a first pivot 54 pivotally connected to the mounting bracket 18 adjacent the rear access opening 12. The hinge 16 also includes a second pivot 56 disposed adjacent to and offset from the first pivot 54. Both the first 54 and second 56 pivots are disposed adjacent the proximal end 52.

An arcuate hinge plate 58 interconnects the second end 48 of the guide rod 44 and the second pivot 56 of the hinge 16. The hinge plate 58 provides the relationship between the hinge 16 and the guide rod 44 so that the hinge 16 pivots about the first pivot 54. The hinge plate 58 and second end 48 of the guide rod 44 are connected by a shaft 60.

The power liftgate assembly 22 further includes a latch mechanism, generally shown at 62. The latch 62 is secured to the sector gear 24. The latch 62 operates between a latched position and an unlatched position. When in the latched position, the latch 62 engages the striker bar 42 to prevent it from moving relative to the sector gear 24. More specifically, the latch 62 engages the striker bar 24 to prevent the striker bar 42 from moving along the slot 30. By doing so, the movement of the sector gear 24 will translate into movement of the striker bar 42. This will result in the movement of the guide rod 44, hinge 16 and the liftgate 14. By unlatching the latch 62, the striker bar 42 is free to move through the slot 30 in the sector gear 24 providing the freedom to manually open and close the liftgate 14.

The latch 62 includes a latch bracket 64 that is fixedly secured to the sector gear 24. The latch 62 also includes a generally U-shaped latch plate 66 that is pivotally connected to the latch bracket 64. The striker bar 42 is received within the latch plate 66 when the latch plate is in the latched position. A latch pawl 68 is pivotally coupled to the bracket 64 for engaging and pivoting the latch plate 66 between the latched position and the unlatched position. A coil spring 70 is connected to the latch pawl 68 to bias the latch plate 68 in the unlatched position.

An actuator 72 is also fixedly secured to the sector gear 24. The actuator 72 is powered to move the latch plate 68 between the latched and unlatched positions. In the embodiments shown in the Figures, the actuator is solenoid driven.

Figure 4:
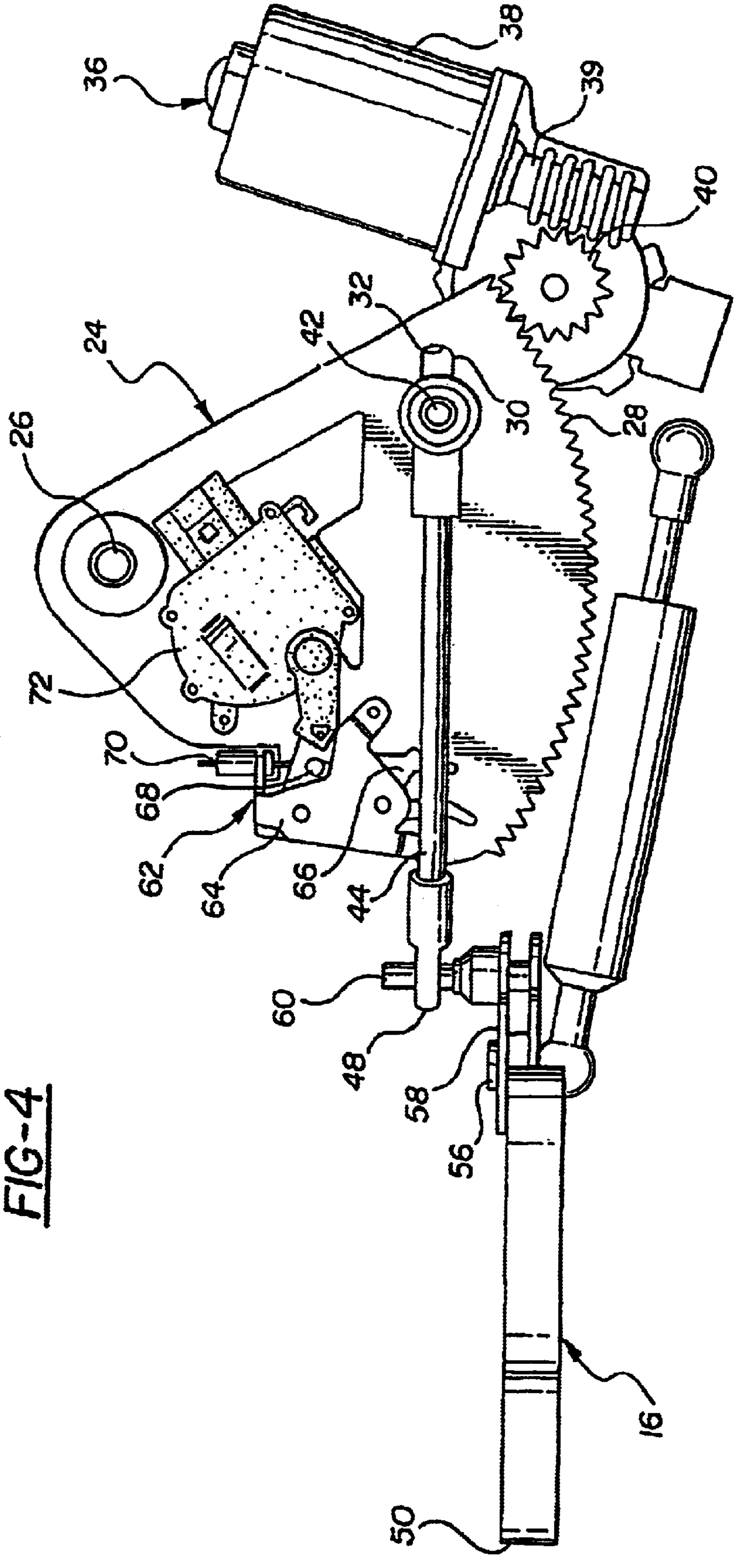
FIG. 4 is a top view of one embodiment of the invention when the striker bar is disengaged.
Figure 5:
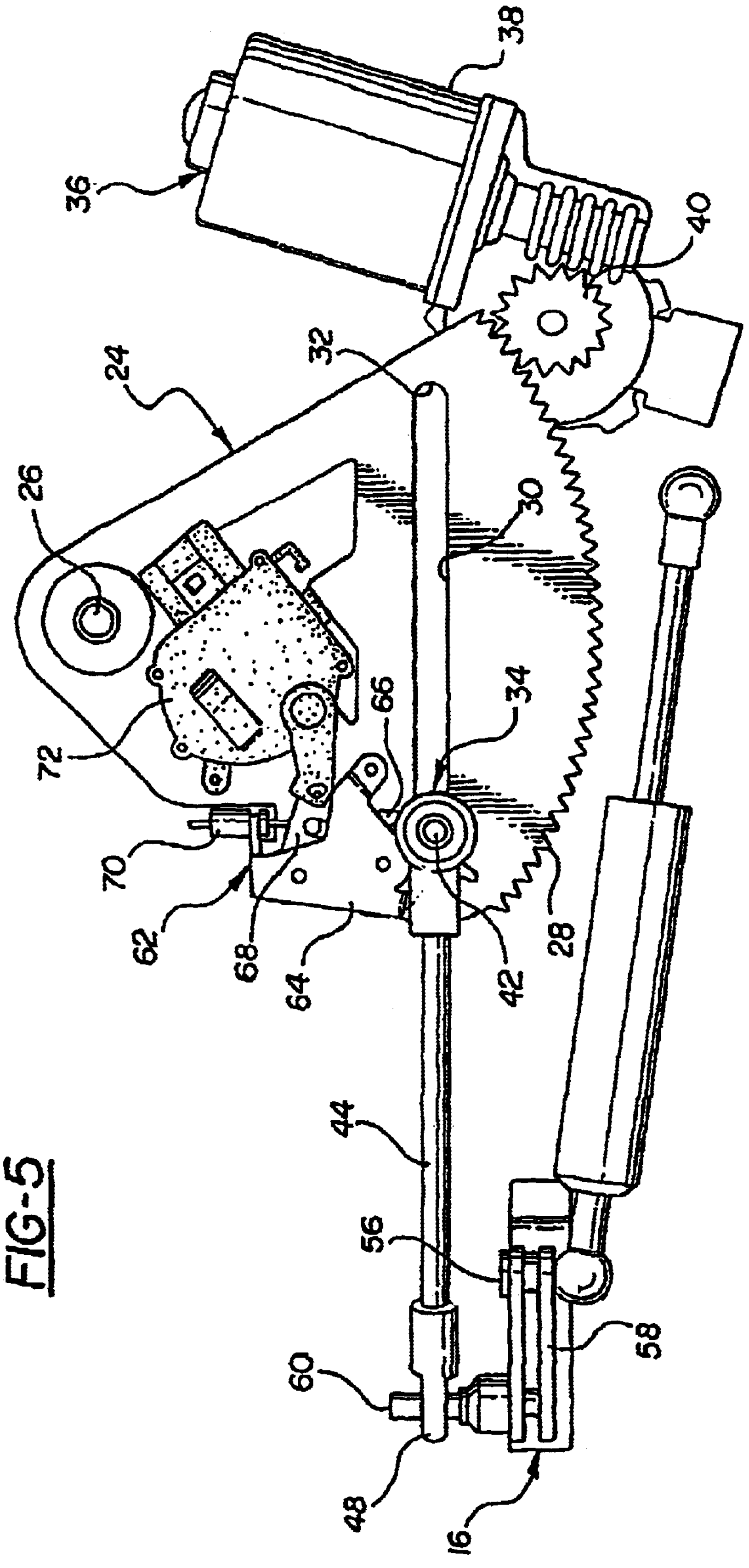
FIG. 5 is a top view of one embodiment of the invention when the striker bar is engaged.
Figure 6:
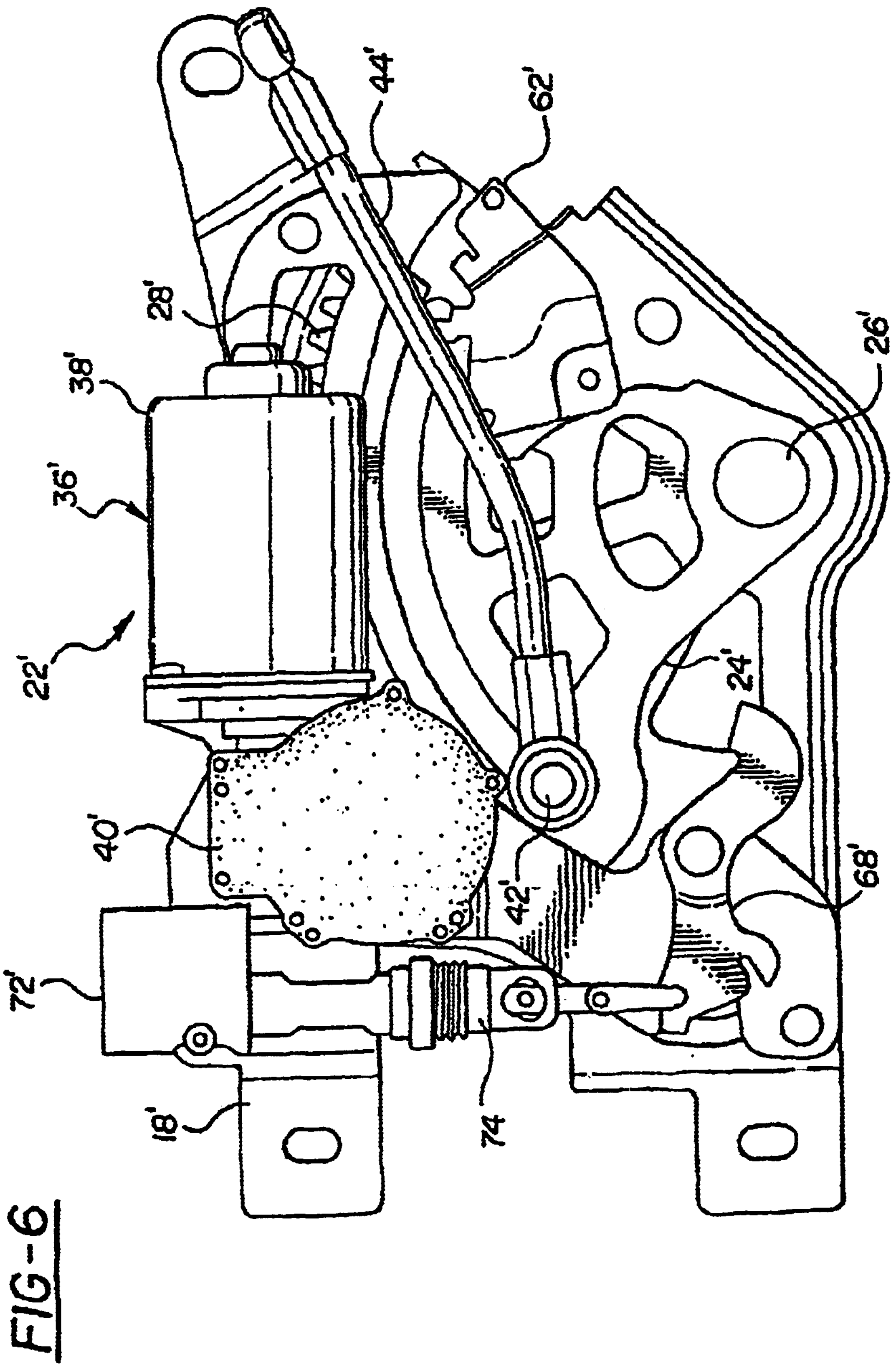
FIG. 6 is a top view of an alternative embodiment of the invention.

Referring to FIG. 6, wherein like primed numerals represent similar elements to that shown in FIGS. 1 through 5, the power liftgate drive assembly 22' is configured to have an arcuate slot 30'. The arcuate slot 30' extends through the same arc that the rack of gear teeth 28' extend.

Another feature that differs between this embodiment and the first embodiment shown is the location of the solenoid actuator 72'. In this embodiment, the solenoid actuator 72' and the solenoid 74 are removed from the sector gear 24'. By being off to the side, the cover, headliner or otherwise, does not have to extend out as far because the solenoid actuator 72' and solenoid 74 do not travel through an arcuate path with the sector gear 24'. This reduces the amount of space consumed in the compartment by the power liftgate drive assembly 22'.

In operation, the powered liftgate drive assembly 22 enables both powered and manual opening and closing of the liftgate 14 of the motor vehicle 10 to provide selective access to the rear compartment of the motor vehicle 10. First, the power liftgate drive assembly 22 allows the liftgate 14 to be manually pivoted between the open and closed positions. The power liftgate drive assembly 22 shown in FIG. 4 with the liftgate 14 in the closed position. The striker bar 42 is positioned along the slot 30 toward the first and 32 by the force of the guide rod 44 connected to the hinge 16. To manually open the liftgate 14, the operator pivots the liftgate 14 about its hinges 16. The hinges 16 pivot about the first pivot 54 and, thus, rotate the second offset pivot 56. The guide rod 44, which is connected between the hinge 16 of the striker bar 42 forces the striker bar 42 to slide along the slot 30 from the second end 34, as shown in FIG. 5, to the first end 32, as shown in FIG. 4. The latch plate 66 remains in the unlatched position disengaged from the striker bar 42 and the sector gear 24 remain stationary about the pivot axle 26. The reverse movement occurs when the liftgate is manually pivoted about its hinges 16 back to the closed position. More specifically, the guide rod 44 is pulled by the hinges 16 to slide the striker bar 42 along the slot 30 from the first end 32 to the second end 34.

Additionally, the liftgate 14 may be automatically pivoted between the open and closed positions by the power liftgate drive assembly 22. Referring to FIG. 5, with the liftgate 14 in the open position, the operator activates a switch within the motor vehicle 10, a key fob, or controller (none shown) to actuate the latch mechanism 62 and drive mechanism 36. The solenoid actuator 72 engages the latch pawl 68 to pivot the latch plate 66 from the unlatched position to the latched position to engage the striker bar 42.

The motor 38 is then powered, or energized, to drive the drive gear 40. The drive gear 40, which is matched with the rack of gear teeth 28, drives or pivots the sector gear 24 about the pivot axle 26 in the counterclockwise direction. With the striker bar 42 locked in the slot 30 by the latch plate 66, as the sector gear 24 rotates, the striker bar 42 pulls on the guide rod 44. The guide rod 44 pulls on the second offset pivot 56 to pivot the hinge 16 about the pivot 54 to close liftgate 14. In order to power open the liftgate 14 from the closed position, the motor 38 is reversed so that the drive gear 40 pivots the sector gear 24 in a clockwise direction about the pivot axle 26. Again, with the striker bar 42 locked in the slot 30 by engagement with the latch plate 66, the guide rod 44 forces the hinge 16 to pivot about the first pivot 54 and open liftgate 14.

Still further, the actuator 72 of the latch mechanism 62 may be controlled such that the latch plate 66 is returned to the unlatched position, or parked position, when the liftgate 14 is in either the open or closed positions to enable manual operation of the liftgate 14. In order to transition from the manual operation and power operation of the drive mechanism 22, the motor 38 includes a hall effect sensor which acts as a position sensor to identify the position of the sector gear 24 for alignment and engagement between the striker bar 42 and the latch plate 66. Therefore, whether the liftgate 14 is in the open or closed position, the sector gear 24 may be pivoted about the axle 26 to position the latch mechanism 62 with the striker bar 42 for actuation of the latch plate 66 from the unlatched position to the latched position engaged with the striker bar 42 for power operation of the liftgate 14.

During normal operation, a capacitor is charged to the voltage of the vehicle battery (not shown) and is electrically isolated from a coil (not shown) of the solenoid actuator 72. For solenoid engagement, the voltage is applied to the coil in a specific polarity. This causes the solenoid piston to be drawn in towards the coil. Once the piston is completely retracted into the coil, a permanent magnet maintains the piston in position.

For solenoid disengagement, the capacitor is discharged through the solenoid in the reverse polarity to that used for engagement. The capacitor need only charge the solenoid enough to counterbalance the magnetic field generated by the permanent magnet, since a mechanical spring is used to assist the disengage process. The capacitor is electrically on such that, in the event of a mid-cycle power failure, the capacitor will discharge through the solenoid and disengage the solenoid. Once disengaged, the power liftgate assembly 22 is returned to the manual operation condition.

The preferred embodiment has been described as the assembly 22 being mounted on the roof panel. However, it is now apparent to those skilled in the art that assembly 22 may also be mounted in the quarter panel of the vehicle 10.

The invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

We claim:

1. A power liftgate drive assembly for moving a liftgate of a motor vehicle between an open position and a closed position, said power liftgate assembly comprising:

a bracket mounted to the motor vehicle adjacent the liftgate;

a drive mechanism fixedly secured to said bracket, said drive mechanism providing a bidirectional rotational force;

a gear pivotally secured to said bracket and coupled to said drive mechanism to receive said bidirectional rotational force to pivot said gear with respect to said bracket, said gear defining a slot extending between first and second ends;

a striker bar coupled to said gear, said striker bar slideable through said slot;

a guide rod connecting said striker bar to the liftgate; and a latch secured to said gear and operable between a latched position and an unlatched position, said latch engaging said striker bar when in said latched position preventing said striker bar from moving along said slot to power the liftgate between the open and closed positions, and said latch disengaging said striker bar when in said unlatched position allowing said striker bar to move along said slot allowing the liftgate to be moved manually between the open and closed positions.

2. A power liftgate assembly as set forth in claim 1 wherein said latch includes an engagement surface to positively abut against said striker bar to inhibit said striker bar from moving through said slot.

3. A power liftgate assembly as set forth in claim 2 wherein said engagement surface includes a relief position allowing said striker bar to disengage said latch after a manual force is applied to the liftgate.

4. A power liftgate assembly as set forth in claim 3 wherein said slot is linear between said first and second ends.

5. A power liftgate assembly as set forth in claim 4 wherein said gear is a sector gear.

6. A power liftgate assembly as set forth in claim 5 wherein said drive mechanism includes a motor having an output shaft.

7. A power liftgate assembly as set forth in claim 6 including a pinion gear fixedly secured to said output shaft and engageable with said sector gear to transfer said rotational force from said motor to said sector gear.

8. A power liftgate assembly as set forth in claim 7 including a hinge plate pivotally secured to said guide rod to translate linear motion of said guide rod into pivotal motion.

9. A power liftgate assembly as set forth in claim 8 including a hinge supporting the liftgate, said hinge coupled between said hinge plate and the liftgate.

10. A power liftgate assembly as set forth in claim 9 wherein said hinge includes first and second pivot points.

11. A power liftgate assembly as set forth in claim 10 including a solenoid fixedly secured to said gear to control said latch.

12. A power liftgate drive assembly for moving a liftgate of a motor vehicle between an open position and a closed position, said power liftgate assembly comprising:

a bracket mounted to the motor vehicle adjacent the liftgate;

a drive mechanism fixedly secured to said bracket, said drive mechanism providing a bidirectional rotational force;

a gear pivotally secured to said bracket and coupled to said drive mechanism to receive said bidirectional rotational force to pivot said gear with respect to said bracket, said gear defining a linear slot extending between first and second ends;

a striker bar coupled to said gear, said striker bar slideable through said linear slot;

a guide rod connecting said striker bar to the liftgate; and a latch secured to said gear and operable between a latched position and an unlatched position, said latch engaging said striker bar when in said latched position preventing said striker bar from moving along said linear slot to power the liftgate between the open and closed positions, and said latch disengaging said striker bar when in said unlatched position allowing said striker bar to move along said linear slot allowing the liftgate to be moved manually between the open and closed positions.

13. A power liftgate assembly as set forth in claim 12 wherein said latch includes an engagement surface to positively abut against said striker bar to inhibit said striker bar from moving through said slot.

14. A power liftgate assembly as set forth in claim 13 wherein said gear is a sector gear.

15. A power liftgate assembly as set forth in claim 14 wherein said drive mechanism includes a motor having an output shaft.

16. A power liftgate assembly as set forth in claim 15 wherein said engagement surface includes a relief position allowing said striker bar to disengage said latch after a manual force is applied to the tailgate;

and including a solenoid fixedly secured to said gear to control said latch.

17. A power liftgate drive assembly for moving a liftgate of a motor vehicle between an open position and a closed position, said power liftgate assembly comprising:

a bracket mounted to the motor vehicle adjacent the liftgate;

a drive mechanism fixedly secured to said bracket, said drive mechanism providing a bidirectional rotational force;

a gear pivotally secured to said bracket and coupled to said drive mechanism to receive said bidirectional rotational force to pivot said gear with respect to said bracket, said gear defining a slot extending between first and second ends;

a striker bar coupled to said gear, said striker bar slideable through said slot;

a guide rod connecting said striker bar to the liftgate;

a latch secured to said gear and operable between a latched position and an unlatched position, said latch engaging said striker bar when in said latched position preventing said striker bar from moving along said slot to power the liftgate between the open and closed positions, and said latch disengaging said striker bar when in said unlatched position allowing said striker bar to move along said slot allowing the liftgate to be moved manually between the open and closed positions; and a solenoid actuator securable to said bracket for moving said latch between said latched position and said unlatched position.

18. A power liftgate assembly as set forth in claim 17 wherein said gear is a sector gear.

19. A power liftgate assembly as set forth in claim 18 wherein said latch includes an engagement surface to positively abut against said striker bar to inhibit said striker bar from moving through said slot.

20. A power liftgate assembly as set forth in claim 19 wherein said engagement surface includes a relief position allowing said striker bar to disengage said latch after a manual force is applied to the liftgate.

* * * * *